US009268707B2

(12) United States Patent
Sahita et al.

(10) Patent No.: US 9,268,707 B2
(45) Date of Patent: Feb. 23, 2016

(54) LOW OVERHEAD PAGED MEMORY RUNTIME PROTECTION

(71) Applicant: Intel Corporation, Santa Clara, CA (US)

(72) Inventors: Ravi L. Sahita, Beaverton, OR (US); Xiaoning Li, Hillsboro, OR (US); Manohar R. Castelino, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 13/730,920

(22) Filed: Dec. 29, 2012

(65) Prior Publication Data

US 2014/0189194 A1 Jul. 3, 2014

(51) Int. Cl.
*G06F 12/02* (2006.01)
*G06F 12/10* (2006.01)
*G06F 9/455* (2006.01)
*G06F 12/14* (2006.01)

(52) U.S. Cl.
CPC ........ *G06F 12/1009* (2013.01); *G06F 9/45533* (2013.01); *G06F 12/145* (2013.01); *G06F 12/0292* (2013.01); *G06F 12/109* (2013.01); *G06F 2212/151* (2013.01)

(58) Field of Classification Search
CPC  G06F 9/45533; G06F 12/109; G06F 12/0292
USPC ............................................. 711/6, 173, 202
See application file for complete search history.

(56) References Cited

U.S. PATENT DOCUMENTS

| | | | |
|---|---|---|---|
| 5,826,041 A | 10/1998 | Ogus | |
| 6,378,023 B1 * | 4/2002 | Christie et al. | ................ 710/260 |
| 6,708,272 B1 | 3/2004 | McCown et al. | |
| 7,444,523 B2 | 10/2008 | Morais et al. | |
| 7,627,758 B1 | 12/2009 | Tock et al. | |
| 8,171,321 B2 | 5/2012 | Kumar et al. | |
| 8,244,945 B2 | 8/2012 | Shanbhogue et al. | |
| 2002/0082824 A1 | 6/2002 | Neiger et al. | |
| 2002/0108050 A1 | 8/2002 | Raley et al. | |
| 2002/0161891 A1 | 10/2002 | Higuchi et al. | |
| 2002/0166070 A1 | 11/2002 | Mualem et al. | |

(Continued)

FOREIGN PATENT DOCUMENTS

| | | |
|---|---|---|
| CN | 101944013 A | 1/2011 |
| EP | 0179401 A2 | 4/1986 |

(Continued)

OTHER PUBLICATIONS

Office Action Received for Japanese Patent Application No. 2011-536632, mailed on Jan. 15, 2013, 4 Pages of Office Action and 4 pages of English Translation.

(Continued)

*Primary Examiner* — Than Nguyen
(74) *Attorney, Agent, or Firm* — Alpine Technology Law Group LLC

(57) ABSTRACT

Methods and apparatus relating to low overhead paged memory runtime protection are described. In an embodiment, permission information for guest physical mapping are received prior to utilization of paged memory by an Operating System (OS) based on the guest physical mapping. The permission information is provided through an Extended Page Table (EPT). Other embodiments are also described.

32 Claims, 7 Drawing Sheets

(56) References Cited

U.S. PATENT DOCUMENTS

| | | |
|---|---|---|
| 2004/0062267 A1 | 4/2004 | Minami et al. |
| 2004/0153672 A1 | 8/2004 | Watt et al. |
| 2005/0039183 A1 | 2/2005 | Romero et al. |
| 2005/0132122 A1 | 6/2005 | Rozas |
| 2005/0182838 A1 | 8/2005 | Sheets et al. |
| 2005/0209876 A1 | 9/2005 | Kennis et al. |
| 2005/0223220 A1 | 10/2005 | Campbell et al. |
| 2005/0246716 A1 | 11/2005 | Smith et al. |
| 2005/0259678 A1 | 11/2005 | Gaur |
| 2005/0278722 A1 | 12/2005 | Armstrong et al. |
| 2006/0048221 A1 | 3/2006 | Morais et al. |
| 2006/0080553 A1 | 4/2006 | Hall |
| 2006/0143687 A1 | 6/2006 | O'Connor et al. |
| 2006/0174077 A1 | 8/2006 | Abadi et al. |
| 2006/0184549 A1 | 8/2006 | Rowney et al. |
| 2006/0190243 A1 | 8/2006 | Barkai et al. |
| 2006/0206887 A1 | 9/2006 | Dodge et al. |
| 2006/0236094 A1 | 10/2006 | Leung et al. |
| 2006/0272027 A1 | 11/2006 | Noble |
| 2007/0006175 A1 | 1/2007 | Durham et al. |
| 2007/0028244 A1 | 2/2007 | Landis et al. |
| 2007/0192761 A1 | 8/2007 | Sahita et al. |
| 2007/0192854 A1 | 8/2007 | Kelley et al. |
| 2007/0266037 A1 | 11/2007 | Terry et al. |
| 2008/0022129 A1 | 1/2008 | Durham et al. |
| 2008/0059811 A1 | 3/2008 | Sahita et al. |
| 2008/0114916 A1 | 5/2008 | Hummel et al. |
| 2008/0201540 A1* | 8/2008 | Sahita et al. ................ 711/159 |
| 2008/0235793 A1 | 9/2008 | Schunter et al. |
| 2008/0244573 A1 | 10/2008 | Sahita et al. |
| 2009/0038017 A1 | 2/2009 | Durham et al. |
| 2009/0172328 A1 | 7/2009 | Sahita et al. |
| 2009/0172346 A1 | 7/2009 | Sahita et al. |
| 2009/0172438 A1 | 7/2009 | Kumar et al. |
| 2009/0222792 A1 | 9/2009 | Shanbhogue et al. |
| 2009/0241189 A1 | 9/2009 | Shanbhogue et al. |
| 2009/0327575 A1* | 12/2009 | Durham et al. ................ 711/6 |
| 2010/0031360 A1* | 2/2010 | Seshadri et al. ............... 726/24 |
| 2010/0169667 A1 | 7/2010 | Dewan |
| 2010/0169968 A1 | 7/2010 | Shanbhogue et al. |
| 2010/0333206 A1 | 12/2010 | Dewan et al. |
| 2012/0151168 A1* | 6/2012 | Tuch et al. ................... 711/163 |
| 2013/0024598 A1* | 1/2013 | Serebrin et al. ............... 711/6 |
| 2013/0104234 A1* | 4/2013 | Northup ...................... 726/24 |

FOREIGN PATENT DOCUMENTS

| | | |
|---|---|---|
| JP | 2006-065851 A | 3/2006 |
| JP | 2007-510198 A | 4/2007 |
| TW | 201032137 A1 | 9/2010 |
| WO | 2005/036405 A1 | 4/2005 |
| WO | 2007/027739 A1 | 3/2007 |
| WO | 2009/069136 A2 | 6/2009 |
| WO | 2010/078143 A2 | 7/2010 |
| WO | 2010/078143 A3 | 8/2010 |

OTHER PUBLICATIONS

"Key BLOBs: Windows CE.NET", from MSDN, Retrieved on Jan. 1, 2013 Webpage Available at: <http://msdn.microsoft.com/en-us/library/ms884374.aspx>, last updated Apr. 8, 2004, with copyright notice 1992-2003.

Office Action Received for U.S. Appl. No. 12/347,890, mailed on Nov. 5, 2012, 24 pages.

Shanbhogue et al., "Virtualization Enabled Integrity Services (VIS)", Nov. 2007, 10 pages.

Office Action Received for U.S. Appl. No. 12/347,890, mailed on Jun. 27, 2012, 25 Pages.

Grevstad, Eric, "CPU-Based Security: The NX Bit Jupiterimages", May 24, 2004, 4 pages.

Office Action Received for U.S. Appl. No. 12/039,486, mailed on Aug. 3, 2012, 13 pages.

Office Action received for U.S. Appl. No. 11/516,113, mailed on Nov. 6, 2009, 17 pages.

International Search Report and Written Opinion received for Patent Application No. PCT/US2009/069136, mailed on Jun. 29, 2010, 6 pages.

International Preliminary Report on Patentability Received for PCT Application No. PCT/US2009/069136, mailed on Jul. 5, 2011, 4 pages.

Office Action Received for U.S. Appl. No. 11/516,113, mailed on May 21, 2010, 14 pages.

Office Action Received for U.S. Appl. No. 12/459,359, mailed on Aug. 30, 2011, 23 pages.

Office Action Received for U.S. Appl. No. 12/459,359, mailed on Jan. 6, 2012, 23 pages.

Office Action Received for U.S. Appl. No. 11/395,488, mailed on Apr. 15, 2008, 20 pages.

Office Action Received for U.S. Appl. No. 11/395,488, mailed on Apr. 27, 2009, 20 pages.

Uhlig, Rich et al., "Intel Virtualization Technology", IEEE Computer Society, May 2005, pp. 48-56.

Notice of Allowance Received for the U.S. Appl. No. 12/050,862, mailed on Apr. 16, 2012, 5 pages.

Office Action Received for U.S. Appl. No. 12/050,862, mailed on Mar. 18, 2011, 10 pages.

Office Action Received fro U.S. Appl. No. 12/050,862, mailed on Oct. 19, 0211, 10 pages.

Dewan, et al., "A Hypervisor-based system for protecting sofware runtime memory and persistent storage", Apr. 2008.

Sahita, et al., "Mitigating the Lying-Endpoint Problem in Virtualized Network Access Framework", Oct. 2007.

Tan, Min, "Home PC Maintenance with Intel AMT", Intel Technology Journal, vol. 11, Issue 1, 12 (Feb. 15, 2007), pp. 57-66.

* cited by examiner

LOW OVERHEAD PAGED MEMORY RUNTIME PROTECTION

FIELD

The present disclosure generally relates to the field of computing. More particularly, an embodiment of the invention generally relates to low overhead paged memory runtime protection.

BACKGROUND

Virtual machines generally provide a mechanism for emulating a computer architecture and functions of a real world computer. A Virtual Machine Monitor (VMM) refers to a software, firmware, or hardware that creates and runs virtual machines A VMM can use an Extended Page Table (EPT) to partition/isolate software within the same virtual address space into separate physical memory views such that the same linear address mapping has differing permissions in separate permission views. This isolation can be used to protect software from malware attacks by separating untrusted software components from trusted software components into different partitions.

Some techniques for using EPT may monitor the guest physical memory and require that the guest OS (Operating System) mapping in the guest page table does not change (i.e., the memory stays non-pageable or pinned in the OS page tables). While software elements may be made non-pageable in the OS address space, making virtual memory non-pageable is not a scalable solution, e.g., for monitoring the memory of a program that the OS may aim to page out to reduce physical memory pressure.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As discussed above, an EPT may be used to monitor the guest physical memory and requires that the guest OS (Operating System) mapping in the guest page table does not change (i.e., the memory stays non-pageable or pinned in the OS page tables). In this way, software elements can be made non-pageable in the OS address space; however, in general, making virtual memory non-pageable is not a scalable solution to monitor memory of a program that the OS may aim to page out to reduce physical memory pressure.

To this end, some embodiments allow for secure monitoring of memory for pageable elements of a program, without restricting the paging operations of the OS. In one embodiment, paged memory receives the appropriate permissions for the guest physical mappings (e.g., via EPT) before the paged memory is utilized by the OS (or components loaded by the OS). This may in turn ensure that malware cannot use pageable memory pages to attack the OS. Moreover, some embodiments can be used to protect, monitor, and/or harden OS kernels and runtime programs. Such techniques may also be used for OS hardening, OS security, OS immutability, security software, anti malware software, etc.

Figure 1:
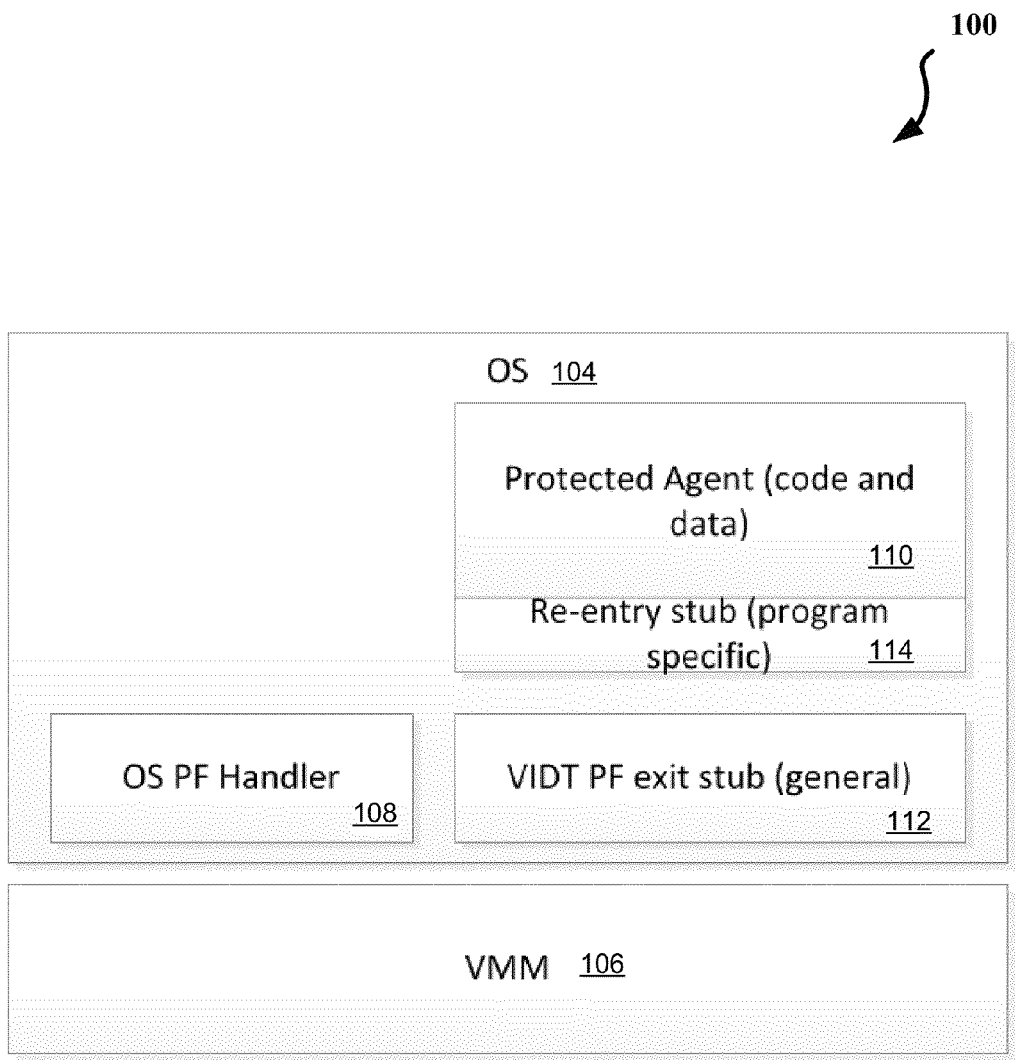
FIG. 1 illustrates an embodiment of the components of a system to provide low overhead paged memory runtime protection, according to an embodiment.

FIG. 1 illustrates an embodiment of the components of a system 100 to provide low overhead paged memory runtime protection, according to an embodiment. The system 100 includes an operating system 104 (e.g., running in a hardware virtual machine), a Virtual Machine Monitor 106 (also referred to as a "hypervisor"). As shown, the OS 104 includes an OS PF (Page Fault) handler logic 108, a protected agent 110 (which may include code and/or data) and a vIDT (virtual Interrupt Descriptor Table) PF exit stub 112 (which may be a general stub), and a re-entry stub 114 (which may be program specific stub). As discussed herein, a "stub" generally refers to a piece of code used to stand in for some other programming functionality.

In an embodiment, the VMM logic 106 isolates the protected agents' code and data memory pages by creating EPT structures that restrict access to the identified pages in untrusted views (EPT1) (e.g., via read only mappings) and allows access in trusted views (EPT2) (e.g., via read-execute, read-write, or execute-only mappings). FIG. 1 shows one such protected agent however note that multiple such agents can be supported in various embodiments.

As execution crosses view boundaries, the hardware generates EPT violations that the VMM may check and allow the view transitions (the VMM allows by updating the EPTP to EPT1 or EPT2 for the example shown). Alternately, the VMM may configure the agent to use VMFUNC instruction leaf 0 (in accordance with at least one instruction set architecture) to perform low latency view switches (e.g., requesting the CPU to update EPTP to EPT1 or EPT2 as per the example). Moreover, a low-latency approach may be defined to handle exits and (re)entries from trusted views using a Virtual IDT (vIDT). The vIDT may have two components that are used in some embodiments: (1) Page Fault handler 108 (also called PF exit stub since PF events may cause "exits" from the protected view to allow the OS to handle the PF event); and/or (2) Re-entry stub 114 that may be used to re-enter the protected view (e.g., at the location at which the agent code was interrupted). In an embodiment, critical code and data sections of the IB agent (where "IB" agent generally refers to an entity that enforces security policy on the system, e.g., noted as Protected Agent in FIG. 1) are mapped in non-pageable memory.

Figure 2:
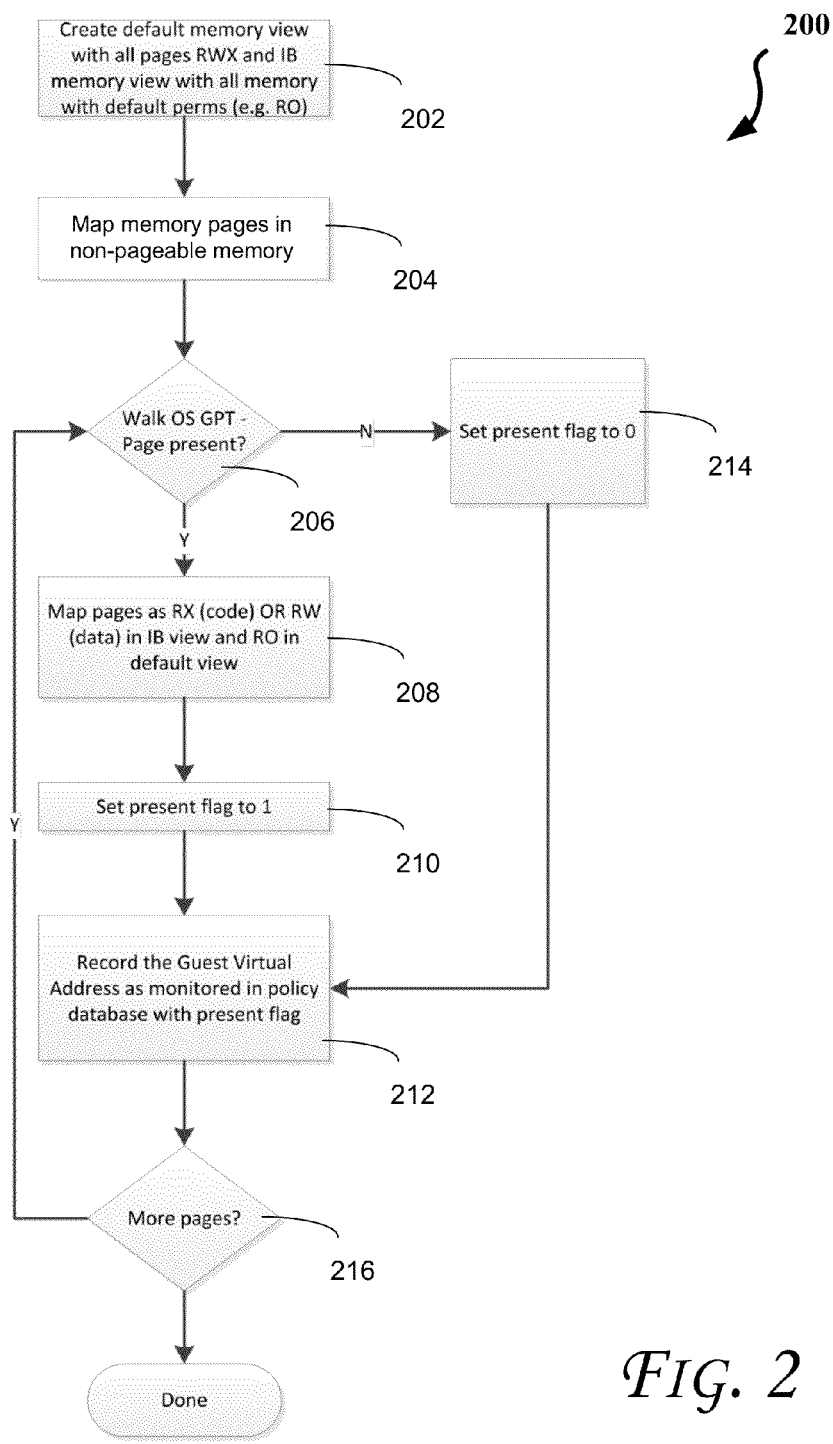
FIGS. 2-4 illustrate flow diagrams of methods, according to some embodiments of the invention.

FIG. 2 illustrates a flow diagram of a method 200 to setup the protected agent view (e.g., where the protected agent pages may be paged out subsequently), according to an embodiment. Method 200 illustrates operations to setup paged memory monitoring in accordance with an embodiment. In some embodiments, one or more components of FIGS. 5 and/or 6 (such as one or more processors or processor cores) perform one or more operations of FIG. 2.

Referring to FIGS. 1-2, at an operation in 202, default memory view is created with all pages RWX (Read, Write, Execute) and IB memory view with all memory with defaults permissions (e.g., RO (Read Only)). At an operation 204, critical code and data sections of the IB agent (for example, vIDT code and policy databases) are mapped in non-pageable memory for all memory pages that are to be protected. At an operation 206, the OS GPT (Global Partition Table) is walked to determine whether the corresponding page is present. If the page is present, page(s) are mapped as Read, Execute (RX) for code or Read, Write, for data in IB view and RO in default view. At an operation 210, a flag is set to one (although depending on the implementation, the flag may be set to other values). At an operation 212, the guest virtual address is recorded as monitored in a policy database together with the present value. If at operation 206 no corresponding page is found, the flag is set to 0 (although depending on the implementation, the flag may be set to other values) and method 200 continues with operation 212. At operation 216, it is determined whether more pages are present for processing. If not, method 200 terminates; otherwise, method 200 is resumed at operation 206.

Figure 3A:
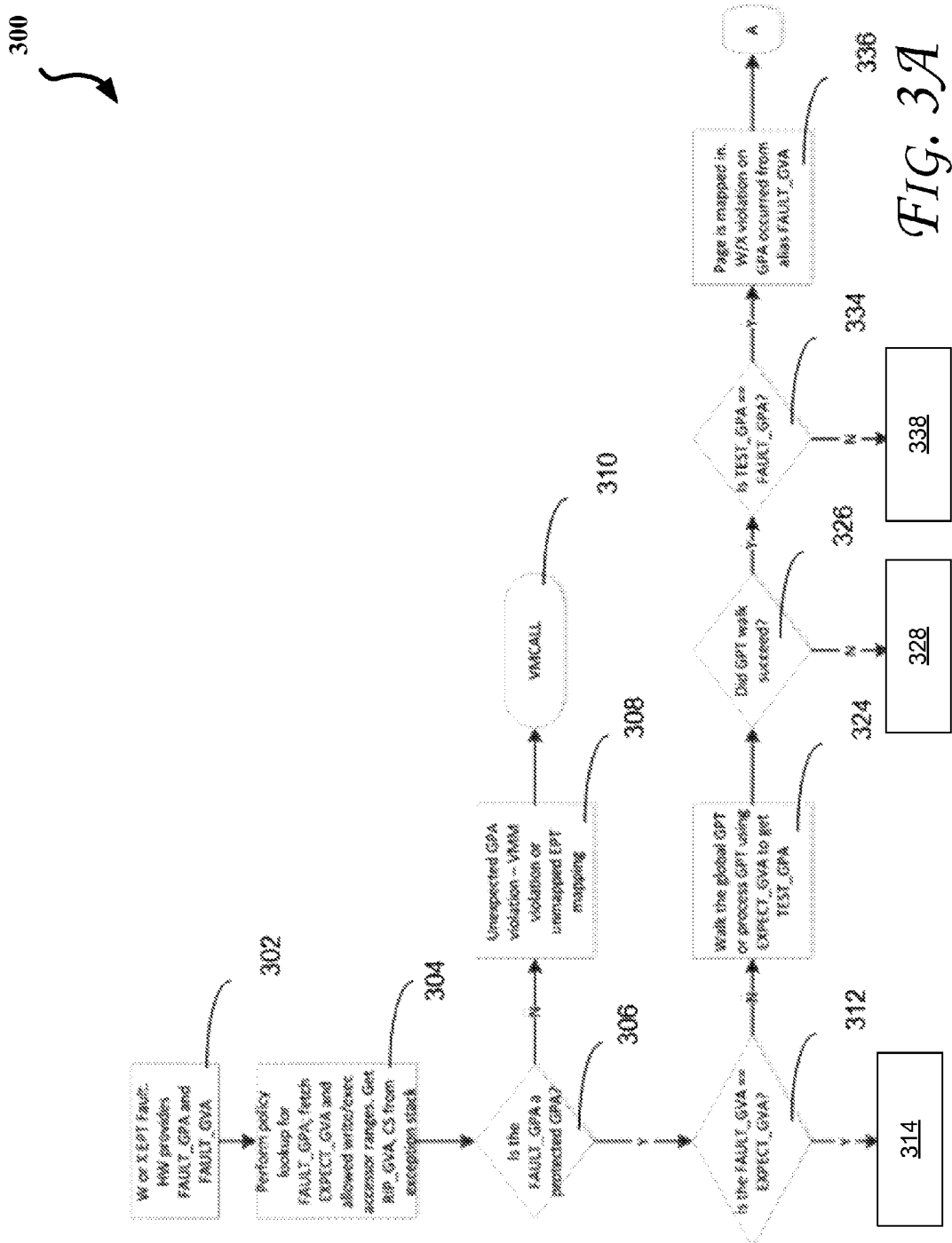
Figure 3B:
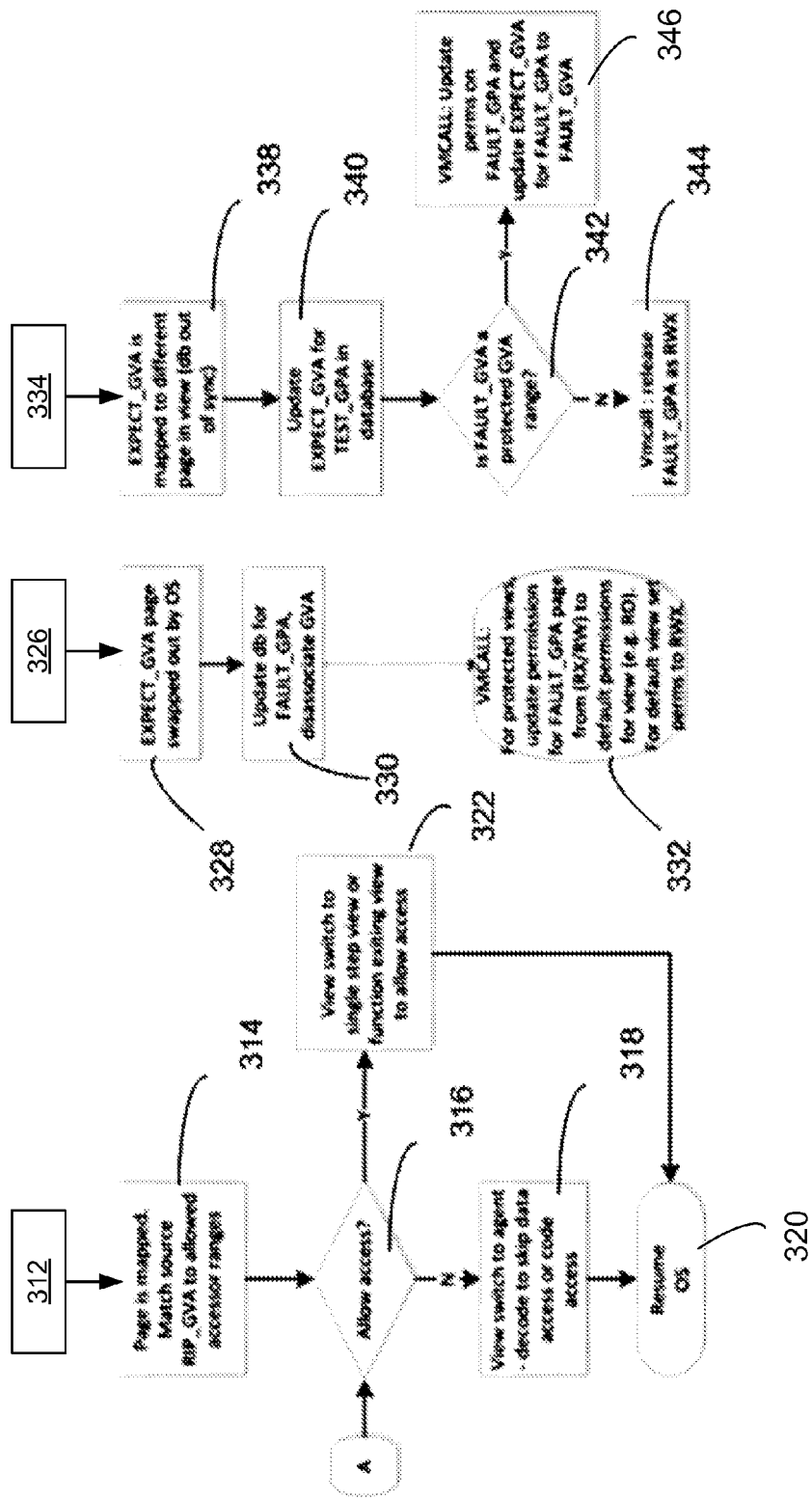

FIGS. 3A and 3B illustrate a flow diagram of a method 300 that vIDT code and the VMM perform to handle page out scenarios, according to some embodiments. In an embodiment, the page out scenario may be performed through TMSL (Trusted Memory Services Layer). In some embodiments, one or more components of FIGS. 5 and/or 6 (such as one or more processors or processor cores) perform one or more operations of FIGS. 3A and 3B.

In an embodiment, the page out scenario is detected via a W (Write) or X (Execute) violation on a protected code or data page in the default view. This may be done when the page is re-assigned by the OS to another driver or process or put back into the zero page pool.

Referring to FIGS. 1-3B, at operation 302, W or X EPT faults are detected and hardware provides fault GPA (Guest Physical Address) and fault GVA (Guest Virtual Address). At an operation 304, policy lookup is performed for fault GOA, and the expected GVA and allowed write/execute accessor ranges are fetched. Also, RIP (next or Relative Instruction Pointer) corresponding to GVA and CS (Code Segment) may be obtained from the exception stack at operation 304. At an operation 306, it is determined whether fault GPA corresponds to a protect GPA. If not, the GPA violation is considered an unexpected GPA violation and/or VMM violation or unmapped EPT mapping at operation 308. At an operation 310, a VM call is made per the detected unexpected violation (e.g., to address the mapping).

At operation 306, if the fault GPA is determined to be to be a protected GPA, it is determined whether the fault GVA is an expected GVA at an operation 312. If it is, the page is mapped and the source of RIP GVA is matched to allowed accessor ranges at an operation 314. At operation 316, it is determined whether to allow access. If not allowed, operation 318 switches view to agent and decoding is performed to skip data access or code access and the OS resumes at operation 320. If access is allowed at operation 316, operation 322 switches view to single step view or function exiting view to allow access, followed by operation 320.

At operation 312, if the fault GVA and expected GVA do not match, operation 324 walks the global GPT or process GPT using expected GVA to obtain a test GPA. At an operation 326, it is determined whether the GPT walk of operation 324 was successful. If unsuccessful, the expected GVA page is swapped out by the OS at operation 328 and data bases is updated for fault GPA (e.g., disassociating GVA) at an operation 330. At an operation 332, a VM call is made for protected view, to update permission for fault GPA page from RX/RW to default permissions for view (e.g., RO) and for default view set permissions to RWX.

At operation 326, if the GPT walk is successful, the test GPA is checked against the fault GPA and if they match, the page is mapped in at an operation 336 (e.g., indicating that the W/X violation on GPA occurred from alias fault GVA) and method 300 resumes at operation 316. Otherwise, the expected GVA is mapped to different page view at an operation 338 (e.g., indicating that the database is out of synchronization). At an operation 340, expected GVA for the test GPA is updated in the database. At an operation 342, it is determined whether the fault GVA is in a protected GVA range. If so, a VM call is made at operation 344 to release the fault GVA as RWX; otherwise, a VM call is made at operation 346 to update permissions of the fault GPA and the expected GVA for fault GPA is updated to fault GVA.

Figure 4:
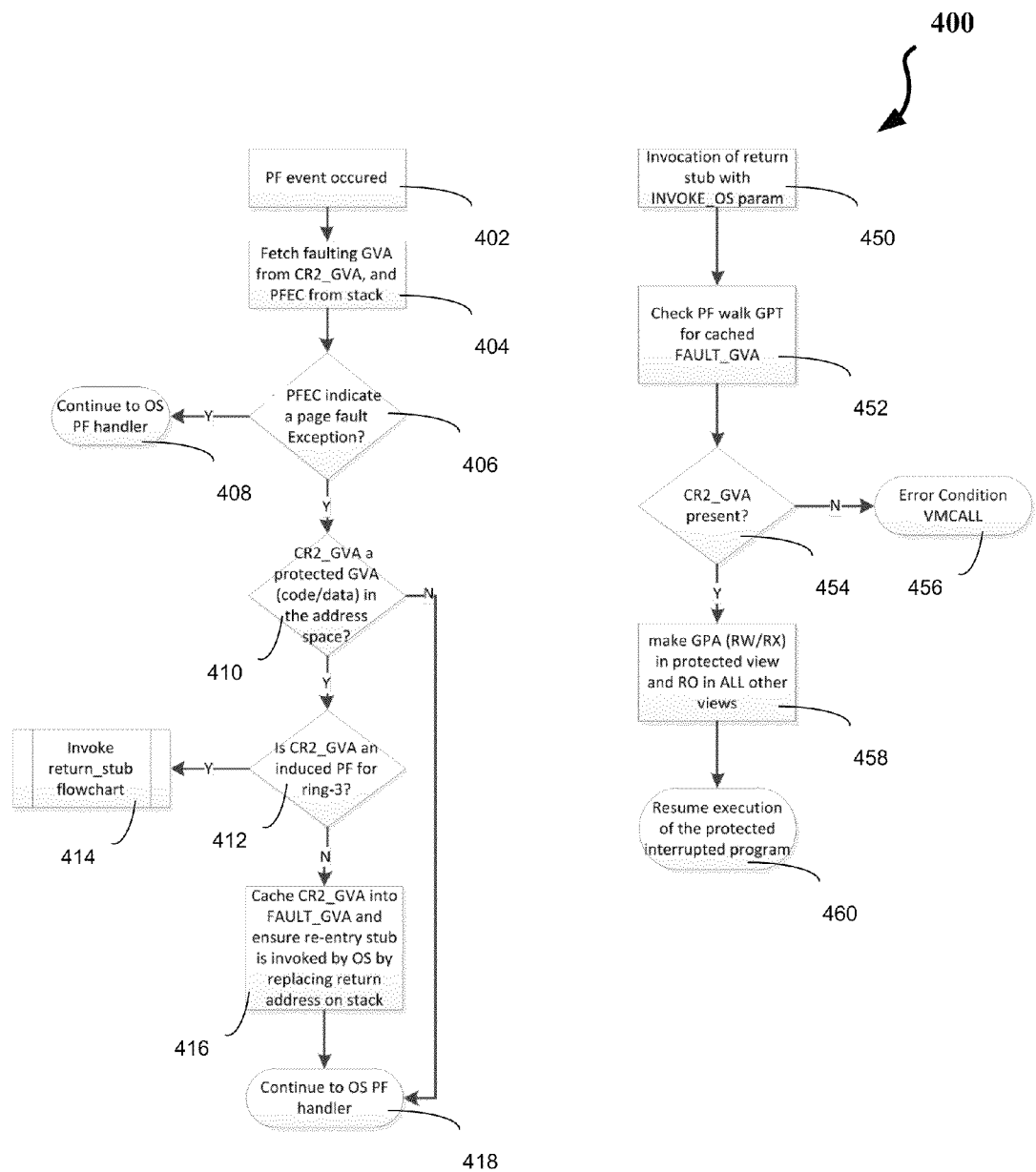

FIG. 4 illustrates a flow diagram for a method 400 (e.g., for the vIDT code and the VMM) to handle page in scenarios, according to some embodiments. In some embodiments, one or more components of FIGS. 5 and/or 6 (such as one or more processors or processor cores) perform one or more operations of FIG. 4. In an embodiment, the page in scenario is detected via a PF for a GVA that belongs to the virtual address range for a protected agent (such as ring 0 or ring 3).

Generally, hierarchical protection domains also called protection rings provide a mechanism to protect data and functionality from faults and/or malicious behavior. For example, a ring 0 corresponds to a level with the most privileges (e.g., directly interacting with physical hardware such as a processor or memory) and ring 3 refers to a user level (e.g., which is prevented from performing certain functions without informing the user first), etc.

Referring to FIG. 4, at an operation 402, it is determined whether a PF event as occurred. At an operation 404, faulting GVA is obtained from CR2 GVA (where CR2 refers to a register that stores an address that generated the exception) and PFEC (Page Fault Error Code) from the stack. At an operation 406, it is determined whether the PFEC indicates a page fault exception. If it does, the method continues to OS PF handler at an operation 408; otherwise, it is determined whether CR2_GVA is a protected GAVA (e.g., code and/or data) in the address space at an operation 410. If it is protected, an operation 412 determines whether CR2_GVA is an induced PF for ring 3. If not, then return stub (e.g., item 114 of FIG. 1) is invoked at operation 414. If the answer to 412 is no, CR2_GVA is cached into fault GVA and re-entry stub is invoked by OS (e.g., by replacing return address on the stack) at an operation 416. At an operation 418 (e.g., after operation 416 or operation 410), method 400 continues to OS PF handler.

As discussed above, at operation 414, the return stub is invoked. To this end, method 400 continues with operation 450 after operation 414 to invoke the return stub with invoke OS parameter(s). An operation 452 checks PF walk of GPT for cached fault GVA. At operation 454, it is determined whether CR2_VGA is present and if not operation 456 signals an error condition via a VM call. If the CR2_GVA is present, GPA is made RW/RX in protected view and RO in all other views at an operation 458. Subsequently, execution of the protected interrupted program is resumed at an operation 460.

Furthermore, some approaches for solving the problems addressed by this disclosure may require performance expensive approaches such as shadowing page tables for each page table created by the OS (which may cause over 30% system overhead). By contrast, some embodiments are expected to only cost less than 5% of system overhead.

Accordingly, some embodiments handle paging of protected memory without compromising performance or security. In an embodiment, paging of protected memory is detected before it is accessed by the protected software to allow the protected memory to be scrubbed. Also, the new OS-assigned memory may be (verified and) protected from untrusted software before the protected software code utilizes it (thus preserving the trust boundary). More particularly, an (e.g., protected) PF handler detects and handles/processes page out and page in affecting protected memory pages in an embodiment. And, the VMM that handles VM calls may assign pages that are paged out with RWX permissions and pages that are paged in with restrictive permissions (e.g., for the untrusted views and RW/RX permissions for the trusted view).

Figure 5:
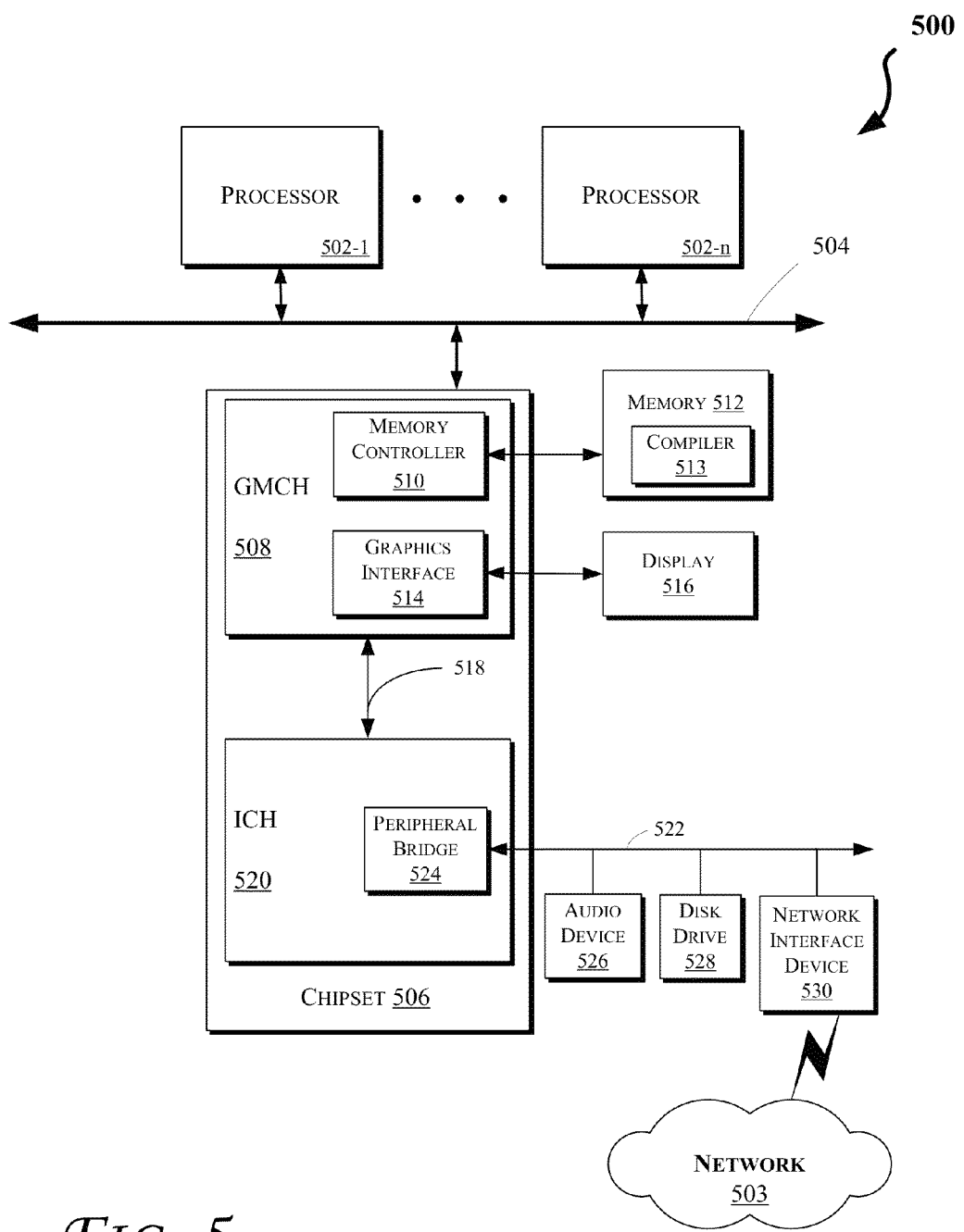
FIGS. 5 and 6 illustrate block diagrams of embodiments of computing systems, which may be utilized to implement some embodiments discussed herein.

FIG. 5 illustrates a block diagram of an embodiment of a computing system 500. In various embodiments, one or more of the components of the system 500 may be provided in various electronic devices capable of performing one or more of the operations discussed herein with reference to some embodiments of the invention. For example, one or more of the components of the system 500 may be used to perform the operations discussed with reference to FIGS. 1-4, e.g., by processing instructions, executing subroutines, etc. in accordance with the operations discussed herein. Also, various storage devices discussed herein (e.g., with reference to FIGS. 5 and/or 6) may be used to store data, operation results, etc. In one embodiment, data received over the network 503 (e.g., via network interface devices 530 and/or 630 and/or communicated between the various elements of FIGS. 1-4) may be stored in caches (e.g., L1 caches in an embodiment) present in processors 502 (and/or 602 of FIG. 6). These processor(s) may then perform the operations discussed herein to provide low overhead paged memory runtime protection in accordance with various embodiments of the invention.

More particularly, the computing system 500 may include one or more central processing unit(s) (CPUs) 502 or processors that communicate via an interconnection network (or bus) 504. Hence, various operations discussed herein may be performed by a CPU in some embodiments. Moreover, the processors 502 may include a general purpose processor, a network processor (that processes data communicated over a computer network 503, or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Moreover, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the CPU 502, or any other device included in the computing system 500. In an embodiment, the memory 512 may be the same or similar to the main memory 412 of FIG. 4. Furthermore, memory 512 may store one or more of the programs or algorithms discussed herein such as a compiler 513, instructions corresponding to executables, mappings, etc. Same or at least a portion of this data (including instructions) may be stored in disk drive 528 and/or one or more caches within processors 502. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display 516. In one embodiment of the invention, the graphics interface 514 may communicate with the display 516 via an accelerated graphics port (AGP). In an embodiment of the invention, the display 516 may be a flat panel display that communicates with the graphics interface 514 through, for example, a signal converter that translates a digital representation of an image stored in a storage device such as video memory or system memory into display signals that are interpreted and displayed by the display 516. The display signals produced by the interface 514 may pass through various control devices before being interpreted by and subsequently displayed on the display 516.

A hub interface 518 may allow the GMCH 508 and an input/output control hub (ICH) 520 to communicate. The ICH 520 may provide an interface to I/O (Input/Output) devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530, which may be in communication with the computer network 503. In an embodiment, the device 530 may be a NIC capable of wireless communication. Other devices may communicate via the bus 522. Also, various components (such as the network interface device 530) may communicate with the GMCH 508 in some embodiments of the invention. In addition, the processor 502, the GMCH 508, and/or the graphics interface 514 may be combined to form a single chip.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration such as discussed with reference to FIG. 6. For example, processors, memory, and/or input/output devices may be interconnected by a number of point-to-point interfaces.

Figure 6:
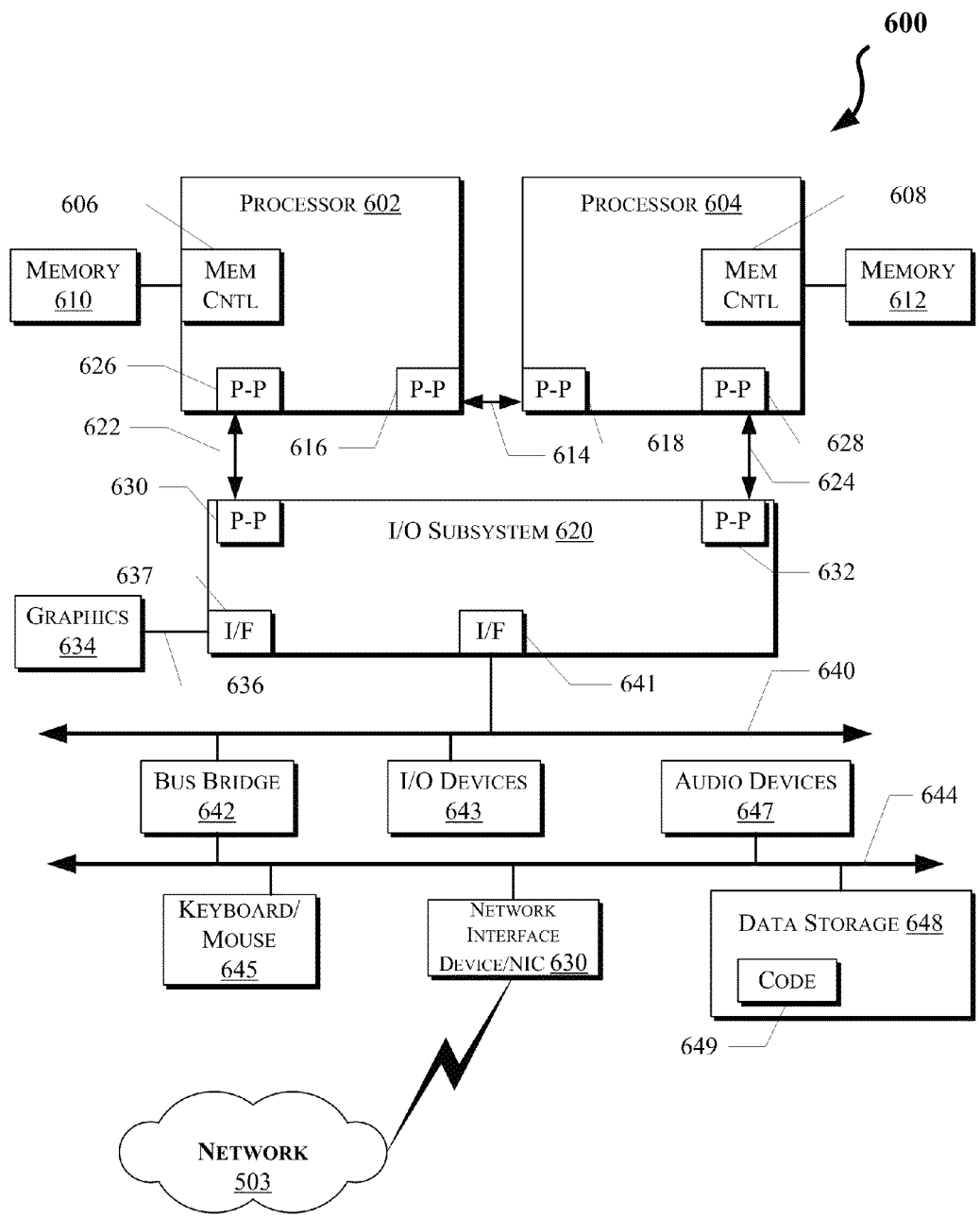

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600. Furthermore, system 600 may be used in laptops, mobile devices, ultrabooks, tablets, Smartphones, etc.

As illustrated in FIG. 6, the system 600 may include several processors, of which only two, processors 602 and 604 are shown for clarity. The processors 602 and 604 may each include a local memory controller 606 and 608 to couple with memories 610 and 612. The memories 610 and/or 612 may store various data such as those discussed with reference to the memory 512 of FIG. 5.

The processors 602 and 604 may be any suitable processor such as those discussed with reference to the processors 602 of FIG. 6. The processors 602 and 604 may exchange data via a point-to-point (PtP) interface 614 using PtP interface circuits 616 and 618, respectively. The processors 602 and 604 may each exchange data with an I/O subsystem 620 via individual PtP interfaces 622 and 624 using point to point interface circuits 626, 628, 630, and 632. The I/O subsystem 620 may also exchange data with a high-performance graphics circuit 634 via a high-performance graphics interface 636, using a PtP interface circuit 637.

At least one embodiment of the invention may be provided by utilizing the processors 602 and 604. For example, the processors 602 and/or 604 may perform one or more of the operations of FIGS. 1-5. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The I/O subsystem 620 may be coupled to a bus 640 using a PtP interface circuit 641. The bus 640 may have one or more devices coupled to it, such as a bus bridge 642 and I/O devices 643. Via a bus 644, the bus bridge 643 may be coupled to other devices such as a keyboard/mouse 645, the network interface device 630 discussed with reference to FIG. 6 (such as modems, network interface cards (NICs), or the like that may be coupled to the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-6.

In some embodiments, a computing device comprises: logic to receive permission information for guest physical mapping prior to utilization of paged memory by an Operating System (OS) based on the guest physical mapping, wherein the permission information is to be received through an Extended Page Table (EPT). A virtual machine monitor logic may isolate one or more memory pages corresponding a protected agent based on the one or more structures of the EPT that restrict access to the one or more pages in an untrusted view. The one or more memory pages may store code or data of the protected agent. The restricted access may be provided via read only mapping. A virtual machine monitor logic may isolate one or more memory pages corresponding a protected agent based on the one or more structures of the EPT that allow access to the one or more pages in a trusted view. The allowed access may be provided via read-execute, read-write, or execute-only mapping. The one or more memory pages may store code or data of the protected agent. A virtual machine monitor logic may process an EPT violation. A Page Fault (PF) handler logic may process page in and page out operations. The OS may comprise a re-entry stub to support program specific page in operations. The OS may comprise a virtual interrupt descriptor table exits stub to support general program page out operations.

In some embodiments, a method comprises: receiving permission information for guest physical mapping prior to utilization of paged memory by an Operating System (OS) based on the guest physical mapping, wherein the permission information is received through an Extended Page Table (EPT). A virtual machine monitor logic may isolate one or more memory pages corresponding a protected agent based on the one or more structures of the EPT that restrict access to the one or more pages in an untrusted view. Code or data of the protected agent may be stored in the one or more memory pages. A virtual machine monitor logic may isolate one or more memory pages corresponding a protected agent based on the one or more structures of the EPT that allow access to the one or more pages in a trusted view. The allowed access may be provided via read-execute, read-write, or execute-only mapping. Code or data of the protected agent may be stored in the one or more memory pages. A virtual machine monitor logic may process an EPT violation. A Page Fault (PF) handler logic may process page in and page out operations.

In some embodiments, a computer-readable medium comprises one or more instructions that when executed on a processor configure the processor to perform one or more operations to: receive permission information for guest physical mapping prior to utilization of paged memory by an Operating System (OS) based on the guest physical mapping, wherein the permission information is received through an Extended Page Table (EPT). The computer-readable medium may comprise one or more instructions that when executed on the processor configure the processor to perform one or more operations to isolate one or more memory pages corresponding a protected agent based on the one or more structures of the EPT that restrict access to the one or more pages in an untrusted view. The computer-readable medium may comprise one or more instructions that when executed on the processor configure the processor to perform one or more operations to store code or data of the protected agent in the one or more memory pages. The computer-readable medium may comprise one or more instructions that when executed on the processor configure the processor to perform one or more operations to provide the restricted access via read only mapping. The computer-readable medium may comprise one or more instructions that when executed on the processor configure the processor to perform one or more operations to isolate one or more memory pages corresponding a protected agent based on the one or more structures of the EPT that allow access to the one or more pages in a trusted view. The computer-readable medium may comprise one or more instructions that when executed on the processor configure the processor to perform one or more operations to provide the allowed access via read-execute, read-write, or execute-only mapping. The computer-readable medium may comprise one or more instructions that when executed on the processor configure the processor to perform one or more operations to store code or data of the protected agent in the one or more memory pages. The computer-readable medium may comprise one or more instructions that when executed on the processor configure the processor to perform one or more operations to process an EPT violation. The computer-readable medium may comprise one or more instructions that when executed on the processor configure the processor to perform one or more operations to process page in and page out operations. The OS may comprise a re-entry stub to support program specific page in operations. The OS may comprise a virtual interrupt descriptor table exits stub to support general program page out operations.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A computing device comprising:
  logic to receive permission information for guest physical mapping prior to utilization of paged memory by an Operating System (OS) based on the guest physical mapping; and
  logic to generate a first representation of memory pages with read, write, and execute access and a second representation of memory pages with read-only access, wherein virtual Interrupt Descriptor Table code and policy data are to be mapped in non-pageable memory for memory pages corresponding to the second representation,
  wherein the permission information is to be received through an Extended Page Table (EPT), wherein an OS Global Partition Table (GPT) is to be examined to determine whether a memory page is present in the GPT, wherein an entry for the memory page is to be updated in the first representation of memory pages or the second representation of the memory pages based on the examination of the GPT.

2. The computing device of claim 1, wherein a virtual machine monitor logic is to isolate one or more memory pages corresponding to a protected agent based on the one or more structures of the EPT that restrict access to the one or more pages in an untrusted view.

3. The computing device of claim 2, wherein the one or more memory pages are to store code or data of the protected agent.

4. The computing device of claim 2, wherein the restricted access is to be provided via read only mapping.

5. The computing device of claim 1, wherein a virtual machine monitor logic is to isolate one or more memory pages corresponding to a protected agent based on the one or more structures of the EPT that allow access to the one or more pages in a trusted view.

6. The computing device of claim 5, wherein the allowed access is to be provided via read-execute, read-write, or execute-only mapping.

7. The computing device of claim 5, wherein the one or more memory pages are to store code or data of the protected agent.

8. The computing device of claim 1, wherein a virtual machine monitor logic is to process an EPT violation.

9. The computing device of claim 1, further comprising a Page Fault (PF) handler logic to process page in and page out operations.

10. The computing device of claim 1, wherein the OS is to comprise a re-entry stub to support program specific page in operations.

11. The computing device of claim 1, wherein the OS is to comprise a virtual interrupt descriptor table exits stub to support general program page out operations.

12. The computing device of claim 1, wherein critical code and a data section of a protected agent are to be mapped in the non-pageable memory.

13. The computing device of claim 1, wherein a guest virtual address, corresponding to the memory page, is to be marked as monitored in response to the presence of the memory page in the GPT.

14. A method comprising:
  receiving permission information for guest physical mapping prior to utilization of paged memory by an Operating System (OS) based on the guest physical mapping; and
  generating a first representation of memory pages with read, write, and execute access and a second representation of memory pages with read-only access, wherein virtual Interrupt Descriptor Table code and policy data are mapped in non-pageable memory for memory pages corresponding to the second representation,
  wherein the permission information is received through an Extended Page Table (EPT), wherein an OS Global Partition Table (GPT) is examined to determine whether a memory page is present in the GPT, wherein an entry for the memory page is updated in the first representation of memory pages or the second representation of the memory pages based on the examination of the GPT.

15. The method of claim 14, further comprising a virtual machine monitor logic isolating one or more memory pages corresponding to a protected agent based on the one or more structures of the EPT that restrict access to the one or more pages in an untrusted view.

16. The method of claim 15, further comprising storing code or data of the protected agent in the one or more memory pages.

17. The method of claim 14, further comprising a virtual machine monitor logic isolating one or more memory pages corresponding to a protected agent based on the one or more structures of the EPT that allow access to the one or more pages in a trusted view.

18. The method of claim 17, wherein the allowed access is to be provided via read-execute, read-write, or execute-only mapping.

19. The method of claim 17, further comprising storing code or data of the protected agent in the one or more memory pages.

20. The method of claim 14, further comprising a virtual machine monitor logic processing an EPT violation.

21. The method of claim 14, further comprising a Page Fault (PF) handler logic processing page in and page out operations.

22. A non-transitory computer-readable medium comprising one or more instructions that when executed on a processor configure the processor to perform one or more operations to:
receive permission information for guest physical mapping prior to utilization of paged memory by an Operating System (OS) based on the guest physical mapping; and
generate a first representation of memory pages with read, write, and execute access and a second representation of memory pages with read-only access, wherein virtual Interrupt Descriptor Table code and policy data are mapped in non-pageable memory for memory pages corresponding to the second representation,
wherein the permission information is received through an Extended Page Table (EPT), wherein an OS Global Partition Table (GPT) is to be examined to determine whether a memory page is present in the GPT, wherein an entry for the memory page is to be updated in the first representation of memory pages or the second representation of the memory pages based on the examination of the GPT.

23. The non-transitory computer-readable medium of claim 22, further comprising one or more instructions that when executed on the processor configure the processor to perform one or more operations to isolate one or more memory pages corresponding to a protected agent based on the one or more structures of the EPT that restrict access to the one or more pages in an untrusted view.

24. The non-transitory computer-readable medium of claim 23, further comprising one or more instructions that when executed on the processor configure the processor to perform one or more operations to store code or data of the protected agent in the one or more memory pages.

25. The non-transitory computer-readable medium of claim 23, further comprising one or more instructions that when executed on the processor configure the processor to perform one or more operations to provide the restricted access via read only mapping.

26. The non-transitory computer-readable medium of claim 22, further comprising one or more instructions that when executed on the processor configure the processor to perform one or more operations to isolate one or more memory pages corresponding to a protected agent based on the one or more structures of the EPT that allow access to the one or more pages in a trusted view.

27. The non-transitory computer-readable medium of claim 26, further comprising one or more instructions that when executed on the processor configure the processor to perform one or more operations to provide the allowed access via read-execute, read-write, or execute-only mapping.

28. The non-transitory computer-readable medium of claim 26, further comprising one or more instructions that when executed on the processor configure the processor to perform one or more operations to store code or data of the protected agent in the one or more memory pages.

29. The non-transitory computer-readable medium of claim 22, further comprising one or more instructions that when executed on the processor configure the processor to perform one or more operations to process an EPT violation.

30. The non-transitory computer-readable medium of claim 22, further comprising one or more instructions that when executed on the processor configure the processor to perform one or more operations to process page in and page out operations.

31. The non-transitory computer-readable medium of claim 22, wherein the OS comprises a re-entry stub to support program specific page in operations.

32. The non-transitory computer-readable medium of claim 22, wherein the OS comprises a virtual interrupt descriptor table exits stub to support general program page out operations.

* * * * *